United States Patent
Terada et al.

(10) Patent No.: US 12,005,954 B2
(45) Date of Patent: Jun. 11, 2024

(54) STEERING COLUMN DEVICE

(71) Applicant: FUJI KIKO CO., LTD., Shizuoka (JP)

(72) Inventors: Daisuke Terada, Shizuoka (JP); Takeshi Miyagi, Shizuoka (JP)

(73) Assignee: JTEKT COLUMN SYSTEMS CORPORATION, Shizuoka (JP)

( * ) Notice: Subject to any disclaimer, the term of this patent is extended or adjusted under 35 U.S.C. 154(b) by 0 days.

(21) Appl. No.: 18/010,055

(22) PCT Filed: May 21, 2021

(86) PCT No.: PCT/JP2021/019324
§ 371 (c)(1),
(2) Date: Dec. 13, 2022

(87) PCT Pub. No.: WO2021/256169
PCT Pub. Date: Dec. 23, 2021

(65) Prior Publication Data
US 2023/0347968 A1 Nov. 2, 2023

(30) Foreign Application Priority Data

Jun. 16, 2020 (JP) ................. 2020-103477

(51) Int. Cl.
*B62D 1/181* (2006.01)
*B62D 1/189* (2006.01)

(52) U.S. Cl.
CPC ............. *B62D 1/181* (2013.01); *B62D 1/189* (2013.01)

(58) Field of Classification Search
CPC ............................... B62D 1/184; B62D 1/181
See application file for complete search history.

(56) References Cited

U.S. PATENT DOCUMENTS

| 8,376,402 B2 | 2/2013 | Yoon et al. |
| 2004/0023746 A1 * | 2/2004 | Arihara .................. B62D 1/181 |
| | | 475/281 |

(Continued)

FOREIGN PATENT DOCUMENTS

| DE | 19962494 A1 * | 7/2000 | ............. B62D 1/181 |
| EP | 1767432 A1 * | 3/2007 | ............. B62D 1/181 |

(Continued)

OTHER PUBLICATIONS

Search Report dated Nov. 3, 2023 issued in corresponding European Application No. 21825584.2.

*Primary Examiner* — Nicole T Verley
(74) *Attorney, Agent, or Firm* — Nath, Goldberg & Meyer; Jerald L. Meyer; Stanley N. Protigal (57) ABSTRACT

A steering column device includes: a link mechanism pivotably supported with respect to a fixing bracket about a first pivot shaft, which is perpendicular to a center axis PC of a steering shaft and is positioned further toward an upper side of a vehicle than the center axis PC, and pivotably supported with respect to a column jacket about a second pivot shaft, which is positioned further toward the upper side of the vehicle than the center axis PC; and a drive mechanism connected to the link mechanism to drive the link mechanism, thereby adjusting a tilt angle of the steering shaft. A sliding member includes a shaft member engaged in an elongated hole which is provided in a portion of the link mechanism which is near the second pivot shaft, and the shaft member is pivotably supported in the elongated hole and fixed to the column jacket.

2 Claims, 6 Drawing Sheets

(56) References Cited

U.S. PATENT DOCUMENTS

2018/0086363 A1   3/2018  Stinebring et al.
2019/0161109 A1   5/2019  Ahn et al.

FOREIGN PATENT DOCUMENTS

| EP | 3162655 A1 | * | 5/2017 | ............ B62D 1/181 |
|----|------------|---|--------|--------------------------|
| JP | 2001-18810 A | | 1/2001 | |
| JP | 2004-58927 A | | 2/2004 | |
| JP | 4696687 B2 | | 3/2011 | |
| JP | 2015182521 A | * | 10/2015 | |
| JP | 2017-081515 A | | 5/2017 | |
| JP | 2019-38439 A | | 3/2019 | |
| JP | 2019-104368 A | | 6/2019 | |

* cited by examiner

STEERING COLUMN DEVICE

This is a National Phase Application filed under 35 U.S.C. 371 as a national stage of PCT/JP2021/019324, filed May 21, 2021, an application claiming the benefit of Japanese Application No. 2020-103477, filed Jun. 16, 2020, the content of each of which is hereby incorporated by reference in its entirety.

TECHNICAL FIELD

The present invention relates to a steering column device.

BACKGROUND ART

A steering column device has been known which includes a fixing bracket fixed to a vehicle body, a column jacket swingably supported in the fixing bracket, a steering shaft housed in the column jacket, and an electric tilt mechanism (Patent Literatures 1 and 2). In such a steering column device, a link mechanism is provided between the fixing bracket and the column jacket, and an electric motor (drive mechanism) is used to drive the link mechanism, which results in swinging the column jacket, thereby adjusting the tilt angle of the steering shaft.

CITATION LIST

Patent Literature

Patent Literature 1: JP Patent No. 4696687
Patent Literature 2: JP Unexamined Patent Application Publication No. 2019-104368

SUMMARY OF THE INVENTION

In the steering column device disclosed in Patent Literature 1, the number of components in the link mechanism is large, which may complicate the structure of the steering column device, thereby increasing the manufacturing cost.

In the steering column device disclosed in Patent Literature 2, the rigidity of mounting to the vehicle may be reduced due to an increase in the distance between the link fulcrum and the fixing point of the vehicle body in the fixing bracket.

Accordingly, an object of the present invention is to provide a steering column device that is capable of reducing the number of components in the link mechanism and sufficiently maintaining the rigidity of mounting to a vehicle.

A steering column device according to an aspect of the present invention includes: a fixing bracket fixed to a vehicle body; a column jacket swingably supported in the fixing bracket; and a steering shaft housed in the column jacket. In addition, the steering column device also includes a link mechanism. The link mechanism is pivotably supported with respect to the fixing bracket about a first pivot shaft, which is perpendicular to a center axis of the steering shaft and is positioned further toward an upper side of a vehicle than the center axis. In addition, the link mechanism is pivotably supported with respect to the column jacket about a second pivot shaft, which is positioned further toward the upper side of the vehicle than the center axis. Further, the steering column device includes: a sliding member pivotably supported with respect to the link mechanism about the second pivot shaft; and a drive mechanism connected to the link mechanism to drive the link mechanism, thereby adjusting a tilt angle of the steering shaft. The sliding member includes a shaft member engaged in an elongated hole which is provided in a portion of the link mechanism which is near the second pivot shaft, and the shaft member is pivotably supported in the elongated hole and fixed to the column jacket.

A steering column device according to an aspect of the present invention makes it possible to reduce the number of components in the link mechanism and sufficiently maintain the rigidity of mounting to a vehicle.

DESCRIPTION OF EMBODIMENTS

Hereafter, an embodiment of the present invention will be described in detail with reference to the drawings.

In the drawings, an arrow FR indicates the front side of the vehicle, and an arrow RR indicates the rear side of the vehicle.

As illustrated in FIGS. 1 to 4, a steering column device 1 includes a fixing bracket 2 fixed to the vehicle body, and a column jacket 3 swingably supported in the vehicle vertical direction with respect to the fixing bracket 2.

The steering column device 1 also includes a steering shaft 4 rotatably supported with respect to the column jacket 3, and an electric tilt mechanism 6 using an electric motor 5 as a driving source.

The fixing bracket 2 includes a fixing portion 2a fixed to the ceiling surface of the vehicle body (not illustrated), and side walls 2b respectively arranged on the left and right sides of a swing support portion 3a of the column jacket 3 in the vehicle. Support holes 2c are formed through the respective side walls 2b.

The column jacket 3 includes a cylindrical lower jacket (outer jacket) 7 extending in the vehicle front-and-rear direction, and a cylindrical upper jacket (inner jacket) 8 housed in the lower jacket 7.

The column jacket 3 (the lower jacket 7) is provided with a shaft support portion 3b at the front end portion, and when the shaft support portion 3b is pivotally supported in the vehicle body, the rear end portion of the column jacket 3 swings in the vehicle vertical direction.

The steering shaft 4 is housed in the upper jacket 8 and movably supported in the axial direction with respect to the lower jacket 7. An adjustable joint 9 (see FIG. 1) is connected to the front end of the steering shaft 4, and a steering wheel 10 (see FIG. 3 and FIG. 4) is connected to the rear end of the steering shaft 4.

Next, the electric tilt mechanism 6 will be described.

The electric tilt mechanism 6 includes a link mechanism 11 which connects the fixing bracket 2 and the column jacket 3, and a drive mechanism 12 which is connected to the link mechanism 11 to drive the link mechanism 11, thereby adjusting the steering shaft 4 to a desired tilt angle.

The link mechanism 11 is pivotably supported about a first pivot shaft P1 with respect to the fixing bracket 2. The first pivot shaft P1 is perpendicular to a center axis PC of the steering shaft 4 and is positioned further toward the upper side of the vehicle than the center axis PC of the steering shaft 4 (see FIG. 3).

In addition, the link mechanism 11 is pivotably supported about a second pivot shaft P2 with respect to the column jacket 3. The second pivot shaft P2 is perpendicular to the center axis PC of the steering shaft 4, and is positioned further toward the upper side of the vehicle than the center axis PC of the steering shaft 4 (see FIG. 3).

The link mechanism 11 includes link members 13 respectively arranged on the left and right sides of the column jacket 3 in the vehicle. Each of the respective link members 13 is configured of a first arm 14 having the first pivot shaft P1 and the second pivot shaft P2, and a second arm 15 integrally formed with the first arm 14 and connected to the drive mechanism 12. The second arm 15 is connected to the drive mechanism 12 on a second axis Q2 tilted at a predetermined angle with respect to a first axis Q1 connecting the first pivot shaft P1 and the second pivot shaft P2 (see FIG. 6).

A bolt hole (first link hole) 16 is formed at the end of the first arm 14 of the link member 13 in the rear side of the vehicle. One end of a shaft member (bolt) 17 constituting the first pivot shaft P1 is pivotably supported in the support hole 2c of the fixing bracket 2, and the other end of the shaft member 17 is fixed in the bolt hole 16 of the first arm 14. A bush 18 is arranged between the shaft member 17 and the inner peripheral surface of the support hole 2c, and a spacer 19 is arranged between the shaft member 17 and the outer surface of the side wall 2b.

An elongated hole (second link hole) 20 is formed at the end of the first arm 14 of the link member 13 at the front side of the vehicle. One end of a shaft member (bolt) 21 constituting the second pivot shaft P2 is pivotably supported in a sliding member 22 engaged in the elongated hole 20, and the other end of the shaft member 21 is fixed in a bolt hole 23 of the lower jacket 7. A spacer 24 is arranged between the inner surface of the link member 13 and the outer surface of the lower jacket 7.

The elongated hole 20 is an elongated hole provided along the vehicle front-and-rear direction (the extending direction of the first axis Q1 connecting the first pivot shaft P1 and the second pivot shaft P2), and the sliding member 22 is slidably supported in the vehicle front-and-rear direction with respect to the elongated hole 20 (the extending direction of the first axis Q1). The sliding member 22 is configured of, for example, a flanged collar having a collar portion and a flange portion.

Figure 1:
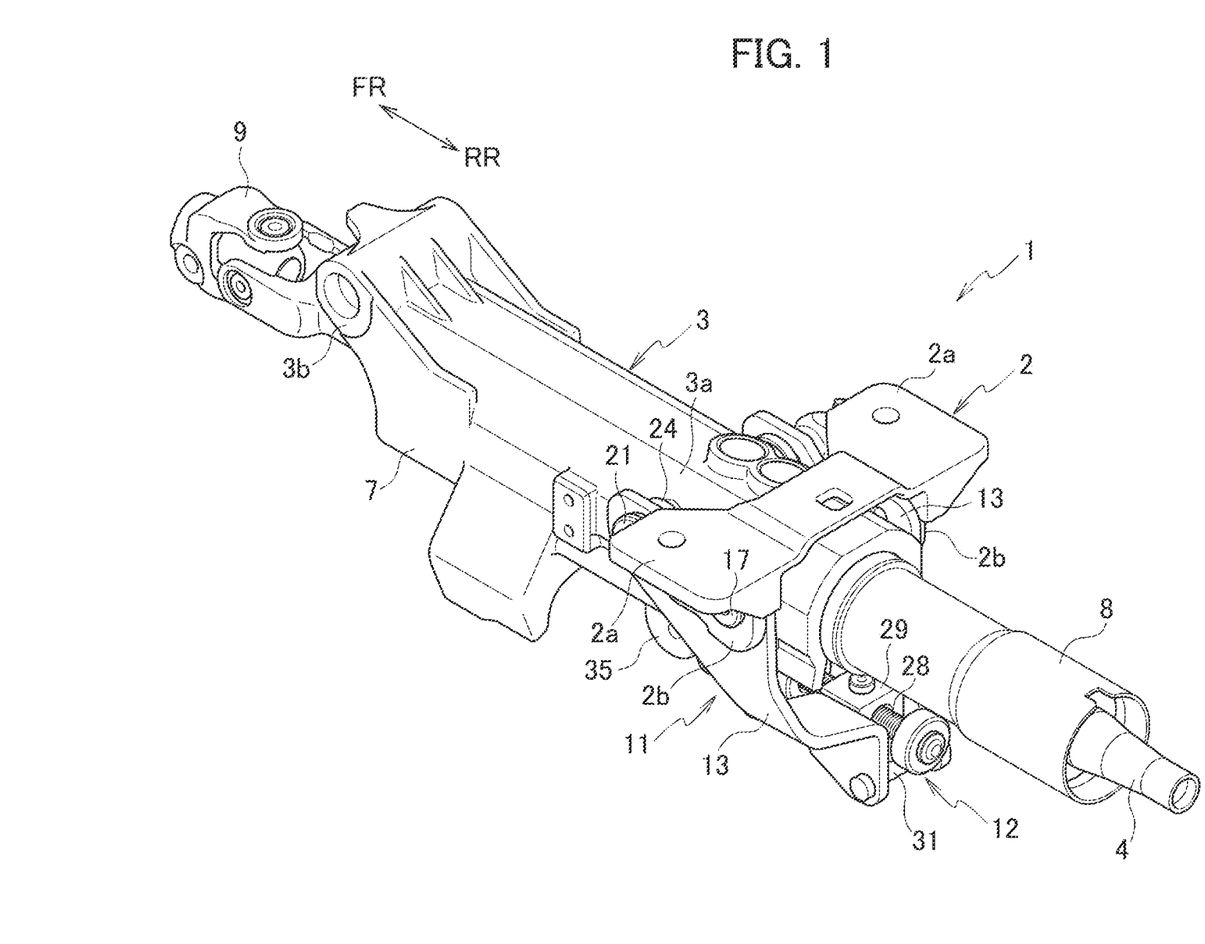
FIG. 1 is a perspective view of a steering column device according to an embodiment of the present invention.
Figure 2:
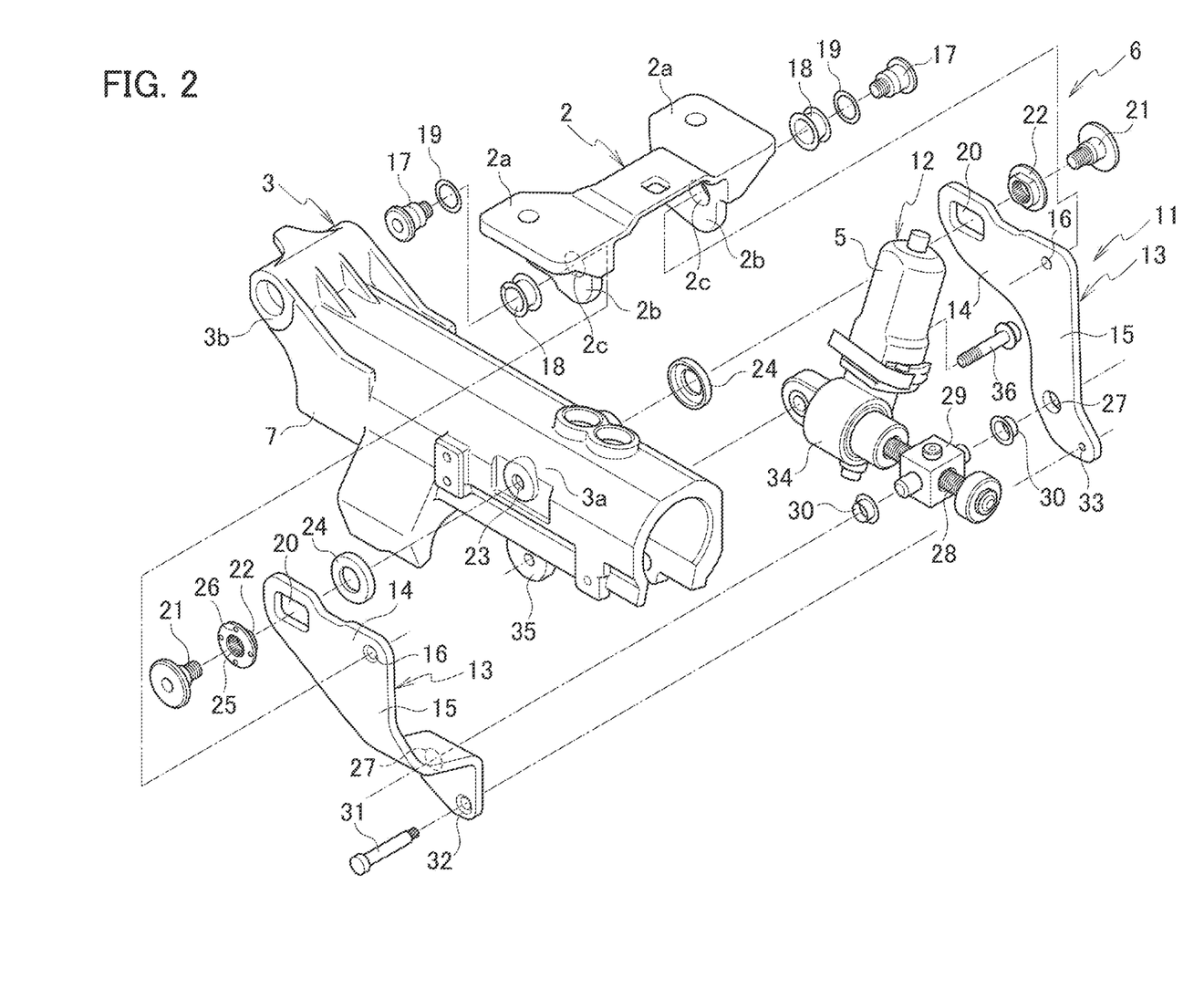
FIG. 2 is an exploded perspective view illustrating a main part of the steering column device according to the embodiment of the present invention.
Figure 3:
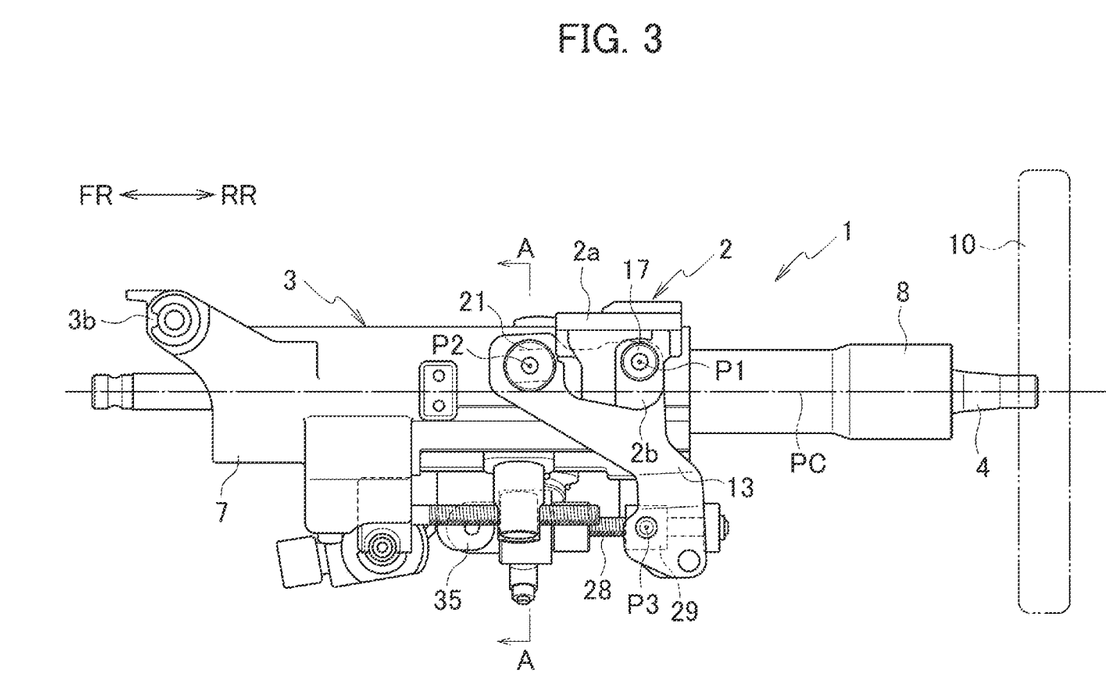
FIG. 3 is a side view illustrating the steering column device according to the embodiment of the present invention.
Figure 4:
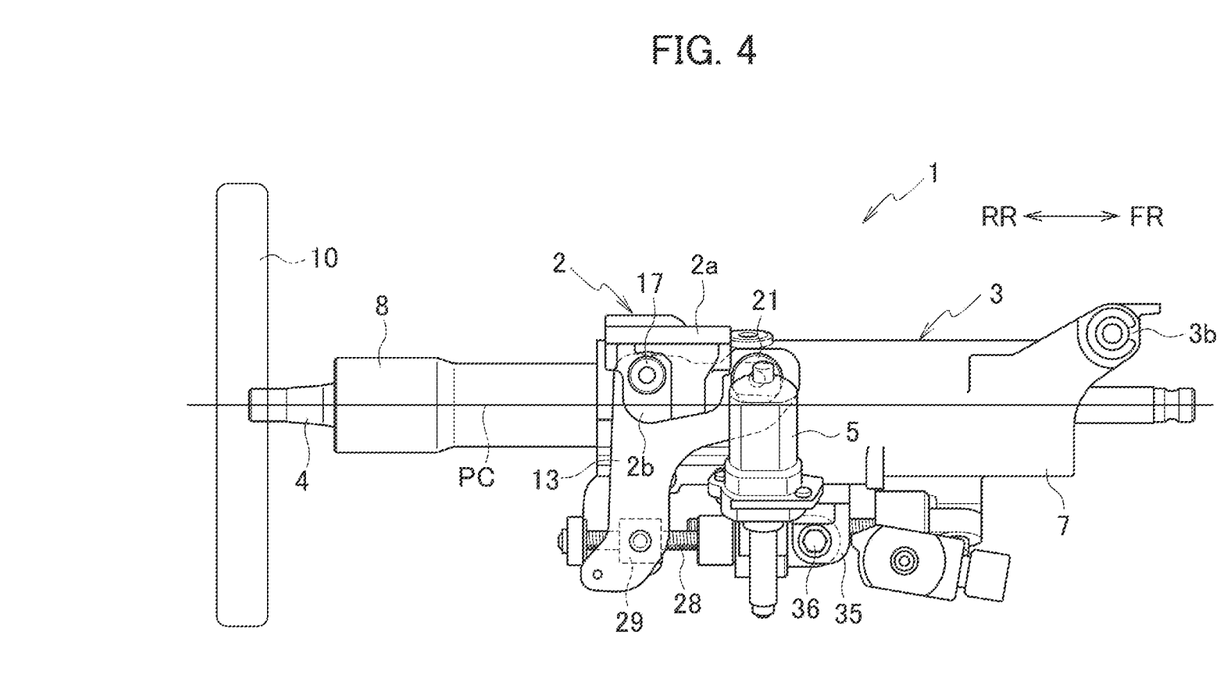
FIG. 4 is a side view of the steering column device according to the embodiment of the present invention as viewed from the side opposite to that illustrated in FIG. 3.
Figure 5:
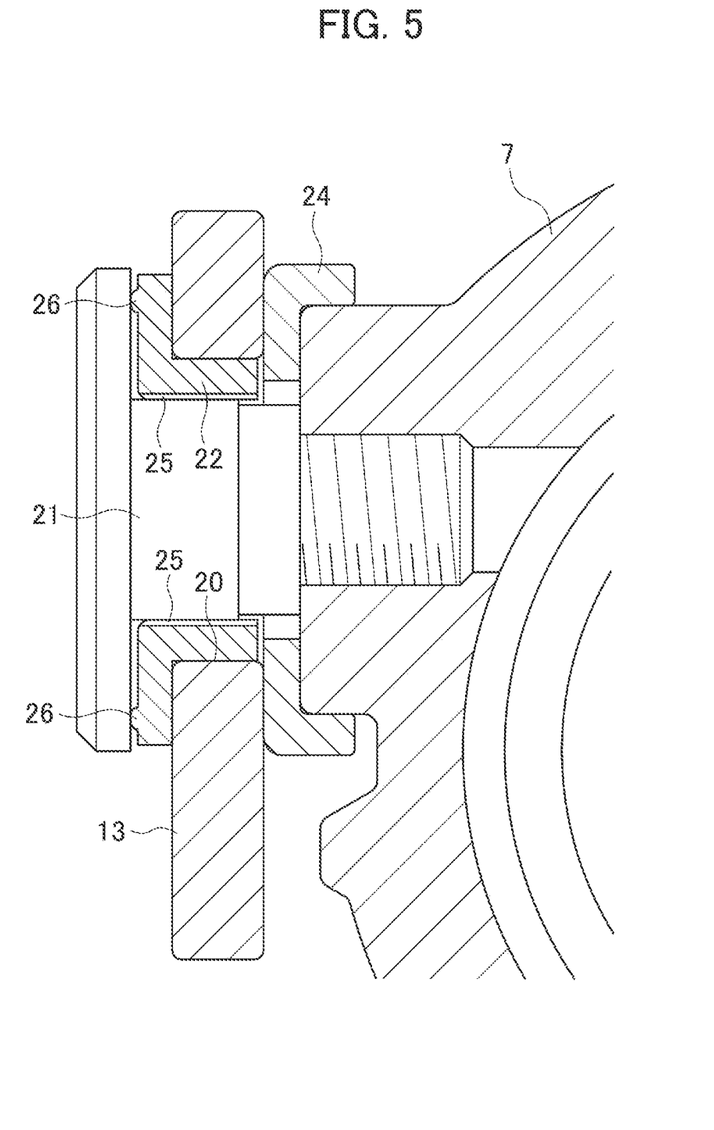
FIG. 5 is an enlarged view of the main part taken along the A-A line in FIG. 3.

A plurality of convex bodies 25 formed by spline processing are formed on the inner peripheral surface of the collar portion in the sliding member 22, and a plurality of convex portions 26 are formed on the outer surface of the flange portion in the sliding member 22 (see FIG. 5). The formation of the convex bodies 25 and the convex portions 26 make it possible to suppress rattling between the shaft member (bolt) 21 and the sliding member 22.

Figure 6:
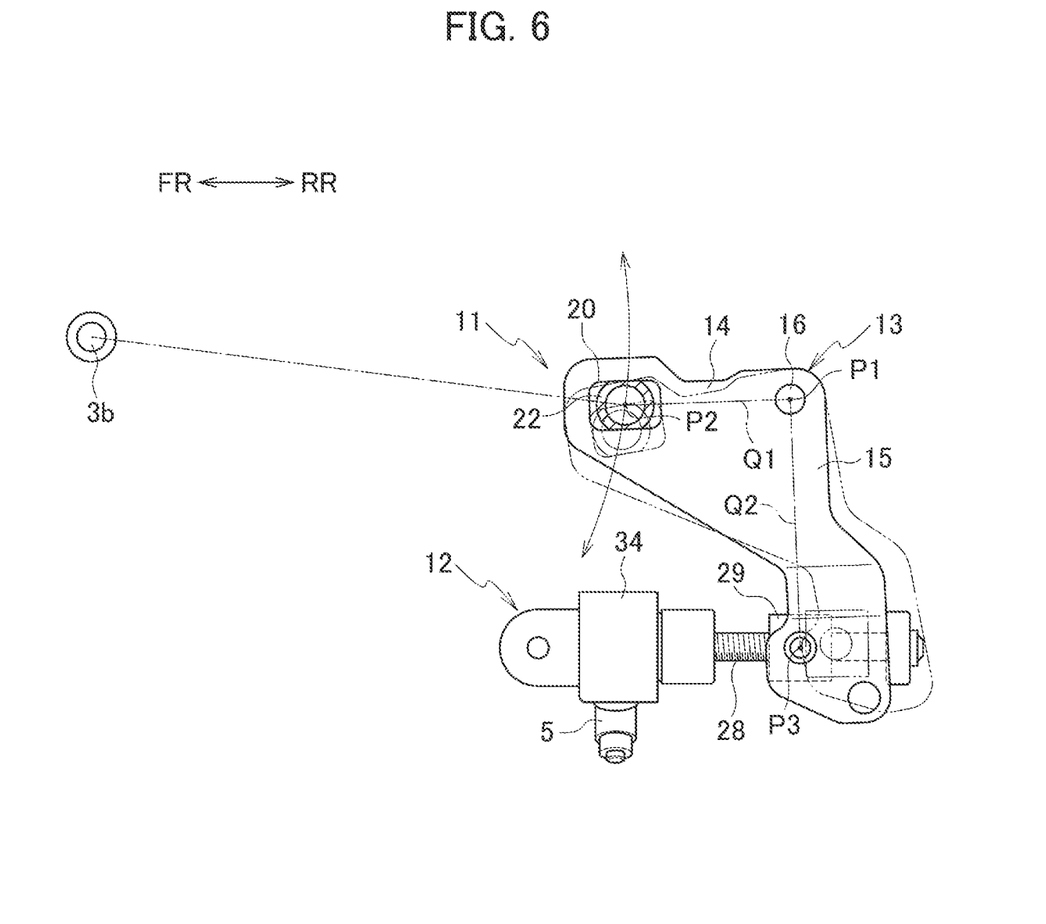
FIG. 6 is figure illustrating the movement of a link mechanism.

In addition, since the sliding member 22 moves together with the column jacket 3 along the extending direction of the elongated hole 20, it is possible to absorb a trajectory difference between the tilt rotation center (shaft support portion 3b) and the link rotation center (first pivot shaft P1) when the column jacket 3 tilts (see FIG. 6).

Further, a round hole (third link hole) 27 is formed at the end of the second arm 15 of the link member 13 in the lower side of the vehicle. In the round hole 27, a screw nut 29 with which a screw shaft 28 is engaged is pivotably supported around a third pivot shaft P3 (see FIG. 3). A spacer 30 is arranged between the inner peripheral surface of the round hole 27 and the screw nut 29.

Further, the link mechanism 11 also includes a connecting portion 31 which connects the link members 13 arranged on the left and right sides of the column jacket 3 in the vehicle. The connecting portion 31 is configured of, for example, a bolt. One end of the connecting portion 31, which is configured of a bolt, is inserted into a bolt insertion hole 32 of one link member 13, and the other end of the connecting portion 31 is fixed in a bolt hole 33 of the other link member 13.

Meanwhile, a reduction gear mechanism 34 and the screw shaft 28 are mounted to the electric motor 5 of the drive mechanism 12, and the screw shaft 28 is engaged with a screw nut 29 pivotably supported in the second arm 15 of the link member 13. In addition, the electric motor 5 is pivotably supported in a motor support portion 35, which is formed at the bottom of the lower jacket 7, using a motor support member (bolt) 36.

In the steering column device 1 of the present embodiment, since the second arm 15 of the link member 13 is pushed and pulled by using the electric motor 5, it is possible to swing the first arm 14 in the vehicle vertical direction with the first pivot shaft P1 (the shaft member 17) as a rotational fulcrum. This swinging movement makes it possible to swing the column jacket 3 in the vehicle vertical direction with the shaft support portion 3b, which is positioned at the front side of the vehicle, as a rotational fulcrum, thereby adjusting the tilt angle of the steering shaft 4 (see FIG. 6).

The operational effect of the present embodiment will be described below.

(1) A steering column device 1 includes: a fixing bracket 2 fixed to a vehicle body: a column jacket 3 swingably supported in the fixing bracket 2; and a steering shaft 4 housed in the column jacket 3. In addition, the steering column device 1 also includes a link mechanism 11. The link mechanism 11 is pivotably supported with respect to the fixing bracket 2 about a first pivot shaft P1, which is perpendicular to a center axis PC of the steering shaft 4 and is positioned further toward an upper side of a vehicle than the center axis PC. In addition, the link mechanism 11 is pivotably supported with respect to the column jacket 3 about a second pivot shaft P2, which is positioned further toward the upper side of the vehicle than the center axis PC. Further, the steering column device 1 includes: a sliding member 22 pivotably supported with respect to the link mechanism 11 about the second pivot shaft P2; and a drive mechanism 12 connected to the link mechanism 11 to drive the link mechanism 11, thereby adjusting the tilt angle of the steering shaft 4. The sliding member 22 includes a shaft member 21 engaged in an elongated hole 20 which is provided in a portion of the link mechanism 11 which is near the second pivot shaft P2, and the shaft member 21 is pivotably supported in the elongated hole 20 and fixed to the column jacket 3.

Connecting the link mechanism 11 and the column jacket 3 through the elongated hole 20 makes it possible to absorb the difference with respect to the axial direction of the column jacket 3 between the movement of the column jacket 3 in the tilting direction (the vehicle vertical direction) and the movement of the link mechanism 11 in the tilting direction. The link mechanism 11 configured as above makes it possible to reduce the number of components.

Further, reducing the distance between the link fulcrum (first pivot shaft P1) and the fixing point of the vehicle body (fixing portion 2a) in the fixing bracket 2 makes it possible to improve the rigidity of mounting to the vehicle.

(2) The link mechanism 11 includes link members 13 arranged on the left and right sides of the column jacket 3 in the vehicle. The link member 13 is configured of a first arm 14 having the first pivot shaft P1 and the second pivot shaft P2, and a second arm 15 integrally formed with the first arm 14 and connected to the drive mechanism 12.

As the link member 13 is configured in this way, it is possible to reduce the number of components in the link mechanism 11.

In the present embodiment, the second pivot shaft P2 is positioned closer to the front side of the vehicle than the first pivot shaft P1; however, the second pivot shaft P2 may be positioned closer to the rear side of the vehicle than the first pivot shaft P1.

The steering column device of the present invention has been described by taking the embodiment described above as an example; however, the steering column device is not limited to the present embodiment, and other various embodiments can be employed without departing from the gist of the present invention.

REFERENCE SIGNS LIST

1 Steering column device
2 Fixing bracket
3 Column jacket
4 Steering shaft
7 Lower jacket (outer jacket)
8 Upper jacket (inner Jacket)
11 Link mechanism
12 Drive mechanism
13 Link member
14 First Arm
15 Second Arm
20 Elongated hole (second link hole)
21 Shaft member (bolt)
22 Sliding member
P1 First pivot shaft
P2 Second pivot shaft
P3 Third pivot shaft
PC Central axis

The invention claimed is:

1. A steering column device comprising:
a fixing bracket fixed to a vehicle body;
a column jacket swingably supported in the fixing bracket;
a steering shaft housed in the column jacket;
a link mechanism pivotably supported with respect to the fixing bracket about a first pivot shaft, which is perpendicular to a center axis of the steering shaft and is positioned further toward an upper side of a vehicle than the center axis, and pivotably supported with respect to the column jacket about a second pivot shaft, which is positioned further toward the upper side of the vehicle than the center axis;
a sliding member pivotably supported with respect to the link mechanism about the second pivot shaft; and
a drive mechanism connected to the link mechanism to drive the link mechanism, thereby adjusting a tilt angle of the steering shaft,
wherein the sliding member includes:
a flanged collar configured with a collar portion and a flange portion and engaged in an elongated hole which is provided in a portion of the link mechanism which is near the second pivot shaft, and the flanged collar is pivotably supported in the elongated hole, and
a shaft member configured with a shaft portion and a head portion, and the shaft member is pivotably supported in the flanged collar and fixed to the column jacket,
and wherein a plurality of convex bodies engaged with the shaft portion of the shaft member are formed on an inner peripheral surface of the collar portion in the flanged collar, and a plurality of convex portions engaged with the head portion of the shaft member are formed on an outer side surface of the flange portion in the flanged collar.

2. The steering column device according to claim 1, wherein the link mechanism includes link members arranged on left and right sides of the column jacket in the vehicle, and the link member is configured of a first arm having the first pivot shaft and the second pivot shaft, and a second arm integrally formed with the first arm and connected to the drive mechanism.

* * * * *